United States Patent
Narayanan et al.

(10) Patent No.: US 11,178,015 B2
(45) Date of Patent: Nov. 16, 2021

(54) SYSTEM, METHOD AND APPARATUS FOR UPDATING NETWORK CONFIGURATION PARAMETERS

(71) Applicant: ZEBRA TECHNOLOGIES CORPORATION, Lincolnshire, IL (US)

(72) Inventors: Venkateswaran Narayanan, Bangalore (IN); Anandakumar Gopalsamy, Bangalore (IN); Sethuraman Vijayakumar, Madurai (IN); Dayal Madhukar Rai, Bangalore (IN); Ambika Nagarajaiah, Bangalore (IN); Alexander Punnamoottil Jacob, Palakkad (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/529,433

(22) Filed: Aug. 1, 2019

(65) Prior Publication Data
US 2021/0036928 A1    Feb. 4, 2021

(51) Int. Cl.
*H04W 16/18* (2009.01)
*H04W 76/10* (2018.01)
(Continued)

(52) U.S. Cl.
CPC ............ *H04L 41/12* (2013.01); *H04W 16/18* (2013.01); *H04W 76/10* (2018.02); *H04W 76/14* (2018.02)

(58) Field of Classification Search
CPC ...... H04L 41/12; H04W 8/005; H04W 16/18; H04W 48/16; H04W 76/10; H04W 76/14; H04W 84/12; H04W 84/22
(Continued)

(56) References Cited

U.S. PATENT DOCUMENTS

| 2010/0220665 A1 | 9/2010 | Govindan et al. |
| 2011/0103264 A1* | 5/2011 | Wentink ............... H04W 8/005 370/255 |

(Continued)

OTHER PUBLICATIONS

Cisco, Enterprise Mobility 4.1 Design Guide, Chapter 2: Cisco, Cisco Unified Wireless Technology and Architecture, updated on Feb. 8, 2014, retrieved from the Internet at <https://www.cisco.com/c/en/US/td/docs/solutions/Enterprise/Mobility/emob41dg/emob41dg-wrapper/ch2_Arch.html#wp1028197> on Jan. 10, 2020.

(Continued)

*Primary Examiner* — Harun Chowdhury (57) ABSTRACT

A method in a client device for updating network configuration parameters, the method comprising: establishing a connection between the client device and an access point connected with a set of other client devices; detecting a connectivity event at the client device; generating a configuration verification request containing current network configuration parameters of the client device; transmitting the configuration verification request for delivery to the set of other client devices; responsive to transmitting the configuration verification request, receiving a configuration verification response from a responding one of the other client devices; and responsive to the configuration verification response indicating non-matching connectivity conditions at the responding client device, initiating a network reconfiguration process at the client device to obtain new network configuration parameters.

25 Claims, 5 Drawing Sheets

(51) Int. Cl.
*H04L 12/24* (2006.01)
*H04W 76/14* (2018.01)

(58) Field of Classification Search
USPC .............................. 370/254, 328, 329, 338
See application file for complete search history.

(56) References Cited

U.S. PATENT DOCUMENTS

| | | | |
|---|---|---|---|
| 2012/0195222 A1 | 8/2012 | Raleigh | |
| 2013/0287012 A1 | 10/2013 | Pragada et al. | |
| 2014/0355593 A1* | 12/2014 | Guan | H04W 84/12 370/338 |
| 2016/0301566 A1 | 10/2016 | Ramasubramani et al. | |
| 2017/0147361 A1 | 5/2017 | Kirvan et al. | |
| 2017/0230811 A1* | 8/2017 | Wentink | H04W 8/005 |
| 2018/0020497 A1 | 1/2018 | Shirai et al. | |
| 2018/0323993 A1 | 11/2018 | Ansari et al. | |
| 2019/0110241 A1 | 4/2019 | Jain | |

OTHER PUBLICATIONS

International Search Report and Written Opinion for International Patent Application No. PCT/US20/044245 dated Oct. 16, 2020.
Tsai et al., "SIM-based subscriber authentication mechanism for wireless local area networks", Institute of Communications Engineering, Jan. 5, 2006, retrieved on [May 10, 2020]. Retrieved from the internet [URL: http://msn.iecs.fcu.edu.tw/report/data/orl_paper/2007-3-22/SIM-based%20subscriber%20authentication%20mechanism%20for%20wireless%20local%20area%20networks.pdf] entire document.
Novelty Search Report for Belgian Patent Application No. 2020/5528 dated Apr. 30, 2021.

* cited by examiner

SYSTEM, METHOD AND APPARATUS FOR UPDATING NETWORK CONFIGURATION PARAMETERS

BACKGROUND

In environments (e.g. warehouses) in which substantial numbers of wireless devices, such as handheld barcode scanners, are deployed, the devices are typically connected to a wireless network deployed within the warehouse. The network may be logically or physically subdivided into a plurality of subnetworks. Roaming of the devices amongst the subnetworks can be time-consuming and result in excessive network load.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a client device for updating network configuration parameters, the method comprising: establishing a connection between the client device and an access point connected with a set of other client devices; detecting a connectivity event at the client device; generating a configuration verification request containing current network configuration parameters of the client device; transmitting the configuration verification request for delivery to the set of other client devices; responsive to transmitting the configuration verification request, receiving a configuration verification response from a responding one of the other client devices; and responsive to the configuration verification response indicating non-matching connectivity conditions at the responding client device, initiating a network reconfiguration process at the client device to obtain new network configuration parameters.

Additional examples disclosed herein are directed to a client device, comprising: a communications interface; a networking controller interconnected with the communications interface, wherein the networking controller is configured to: establish a connection between the client device and an access point connected with a set of other client devices; detect a connectivity event at the client device; generate a configuration verification request containing current network configuration parameters of the client device; transmit the configuration verification request for delivery to the set of other client devices; responsive to transmission of the configuration verification request, receive a configuration verification response from a responding one of the other client devices; and responsive to the configuration verification response indicating non-matching connectivity conditions at the responding client device, initiate a network reconfiguration process at the client device to obtain new network configuration parameters.

Further examples disclosed herein are directed to a system, comprising: an access point; and a client device including a communications interface and a networking controller, wherein the networking controller is configured to: establish a connection between the client device and the access point connected with a set of other client devices; detect a connectivity event at the client device; generate a configuration verification request containing current network configuration parameters of the client device; transmit the configuration verification request for delivery to the set of other client devices; responsive to transmission of the configuration verification request, receive a configuration verification response from a responding one of the other client devices; and responsive to the configuration verification response indicating non-matching connectivity conditions at the responding client device, initiate a network reconfiguration process at the client device to obtain new network configuration parameters; wherein the access point is configured to receive the configuration verification request, and to select the responding client device from the set of other client devices.

Figure 1:
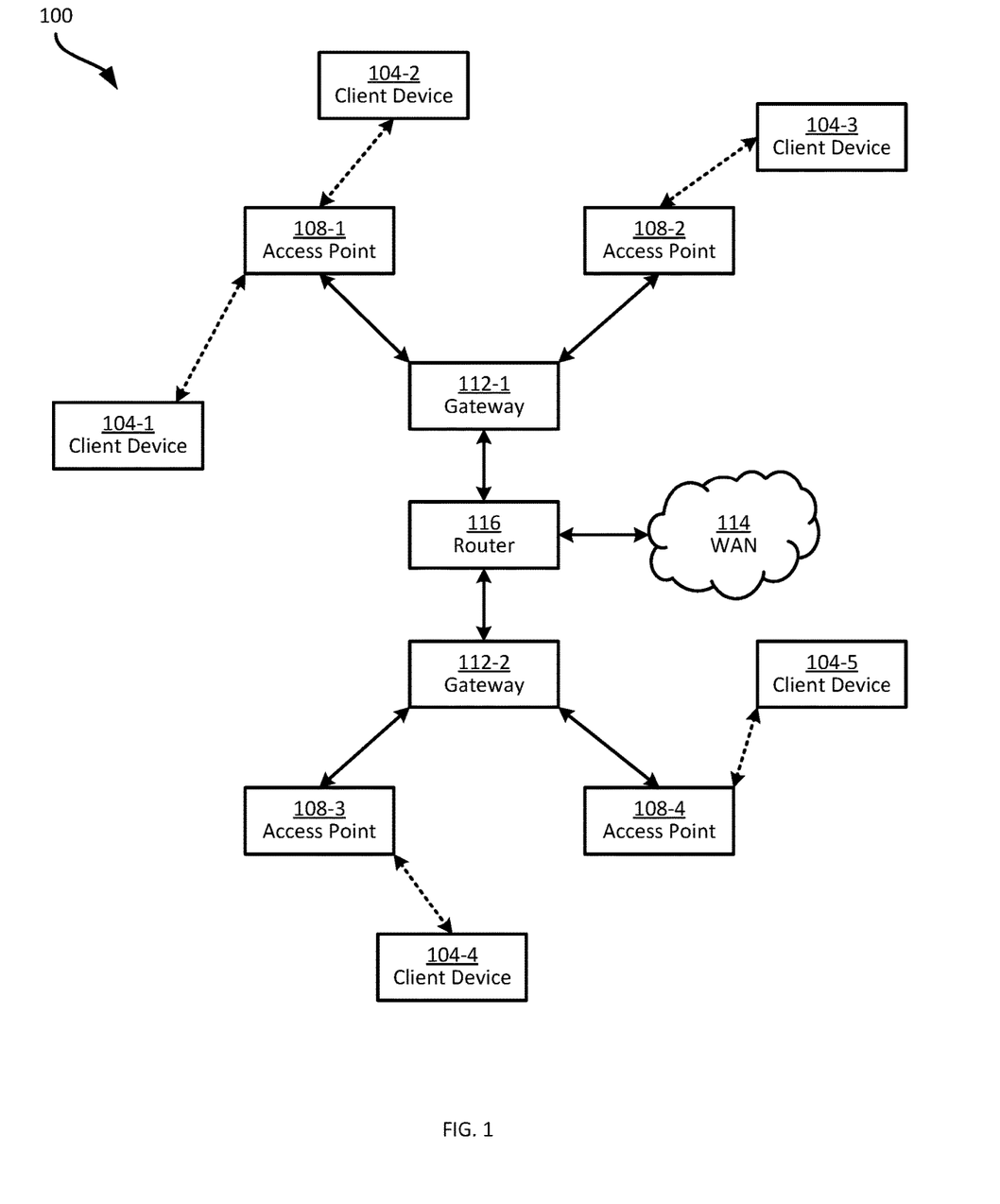
FIG. 1 is a diagram illustrating a communication system

FIG. 1 depicts a communication system 100 including a plurality of wireless client computing devices, of which six examples 104-1, 104-2, 104-3, 104-4, 104-5 and 104-6 are illustrated (collectively referred to as the wireless client computing devices 104, and generically referred to as a wireless client computing device 104). Greater or smaller numbers of client devices 104 can be provided in other embodiments, and indeed the number of client devices present in the system 100 at any given time can vary. The wireless client computing devices 104 are also referred to herein simply as devices 104. The system 100 implements a wireless network, such as a wireless local area network (WLAN) enabling the devices 104 to communicate with each other and with other computing devices, either within the WLAN or connected to an external network.

The system 100 implements the above-mentioned WLAN via a plurality of access points (APs) 108, four examples 108-1, 108-2, 108-3 and 108-4 of which are shown in FIG. 1. Each AP 108 provides an area of coverage within which the devices 104 may establish wireless connections with the APs 108 (illustrated in dashed lines in FIG. 1). As will be apparent, greater or smaller number of APs 108 may be provided in other embodiments. The APs 108 may be distributed throughout a facility such as a warehouse, an office complex, a campus or the like. The devices 104 may be moved throughout the facility, for example as the operators of the devices travel through the facility. Each device 104 may therefore roam between the APs 108, establishing wireless links with different ones of the APs 108 depending on the current location of the device 104.

In addition, a device 104 may periodically lose connectivity with one or more elements of the system 100, e.g. due to network congestion, physical obstructions in the vicinity of the device 104, and the like. Roaming and connection losses are referred to generally as connectivity events in the discussion below. The devices 104, as will be discussed herein in greater detail, perform various actions to adapt to connectivity events and reconfigure local network configuration settings as necessary, while mitigating the impact of such reconfiguration on network infrastructure and on operations of the devices 104 themselves.

The APs 108 are configured to deploy a single wireless network, e.g. identified by a common service set identifier (SSID), throughout the facility. However, as will be apparent to those skilled in the art, the infrastructure supporting the APs 108 may be subdivided into two or more distinct networks, either physically or logically, e.g. to facilitate network management. In the present example, the system 100 implements two distinct virtual local area networks (VLANs). In particular, a first VLAN is provided via the APs 108-1 and 108-2, which are connected to a first gateway 112-1. A second VLAN is provided via the APs 108-3 and 108-4, which are connected to a second gateway 112-2. Additional network components such as switches and WLAN controllers are not shown for clarity of illustration. Although the APs 108 and/or gateways 112 may be physically interconnected via backend connections and the above-mentioned switches, the implementation of distinct VLANs segregates the APs 108 and gateway 112 of the first VLAN from the APs 108 and gateway 112 of the second VLAN. Traffic may therefore only travel between VLANs, and between a VLAN and an external network 114 (e.g. a wide area network (WAN) such as the Internet), via a central router 116. The router 116 may also implement firewall and/or other network management functionality.

In addition to segregation of the system 100 into multiple VLANs, the system 100 is segregated into multiple subnetworks (also referred to as subnets) in the present example. Specifically, of a set of network addresses (e.g. IP addresses) available for assignment to devices within the system 100, a first subset is employed exclusively within the first VLAN, and a second subset is employed exclusively within the second VLAN. That is, the gateway 112-1, which in the present example also implements an addressing server (e.g. a Dynamic Host Configuration Protocol (DHCP) server), assigns network addresses to the APs 108-1 and 108-2 as well as any client devices 104 connected thereto from a specific subset of network addresses available system-wide.

As a result of the above segregation of the network infrastructure in the system 100, the network configuration of a device 104 roaming from an AP 108 in the first VLAN (and corresponding subnet) to an AP 108 in the second VLAN (and corresponding subnet) requires updating for the device 104 to continue communicating with other entities in the system 100. For example, each device 104 stores various network configuration parameters, including a network address (e.g. an IP address), a subnet mask, and one or more network addresses of the corresponding gateway 112 with which the device 104 is currently associated. For example, the device 104 may store both a Media Access Control (MAC) address and an IP address of the relevant gateway 112. Upon roaming to an AP 108 in a different VLAN, the device 104 must obtain a new network address and subnet mask, as well as new gateway identifiers.

Updating of network configuration parameters at a device 104 may be accomplished in various ways. For example, each device 104 may release (i.e. discard) all network configuration parameters upon roaming to a different AP 108 and request new configuration parameters, e.g. by transmitting a DHCP request. When the new AP 108 is in the same VLAN and subnet as the previous AP 108 to which the device 104 was connected, however, such a process may be unnecessary and therefore imposes excess load on the network. Further, such a process may negatively affect ongoing communication sessions on the device 104, such as a Voice over IP (VoIP) call between the device 104 and another computing device.

As will be discussed in detail below, the devices 104 of the system 100 therefore perform various actions to update network configuration parameters while mitigating the impact of such updates on network load and/or on ongoing communication session at the devices 104.

Figure 2:
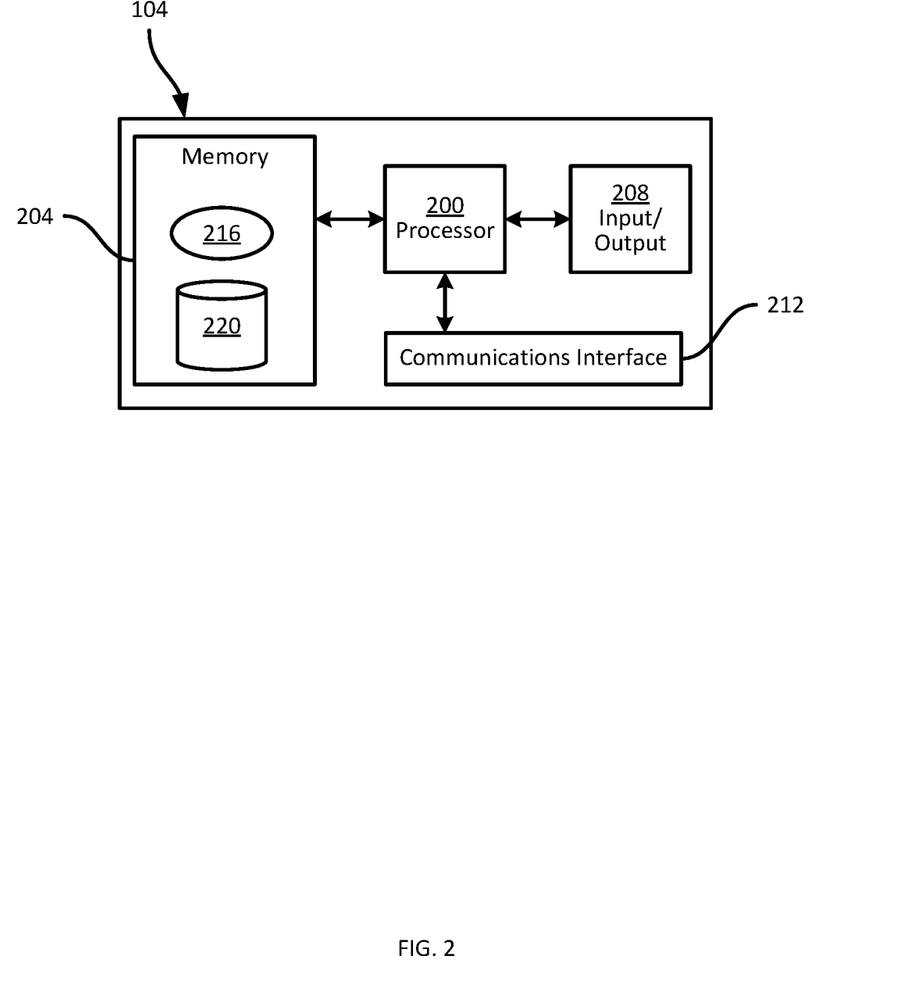
FIG. 2 is a block diagram of certain components of a wireless client computing device of FIG. 1.

Before discussing the functionality of the devices 104, certain internal components of the devices 104 will be discussed with reference to FIG. 2. FIG. 2 illustrates components of a generic device 104. That is, each of the client devices 104 in the system 100 include the components shown in FIG. 2, although the client devices 104 may have heterogeneous form factors and implementations of the components shown.

The device 104 includes a central processing unit (CPU), also referred to as a processor 200, interconnected with a non-transitory computer readable storage medium, such as a memory 204. The memory 204 includes any suitable combination of volatile memory (e.g. Random Access Memory (RAM)) and non-volatile memory (e.g. read only memory (ROM), Electrically Erasable Programmable Read Only Memory (EEPROM), flash). The processor 200 and the memory 204 each comprise one or more integrated circuits (ICs).

The device 104 also includes at least one input device, and at least one output device, illustrated in FIG. 2 as an input/output device 208 interconnected with the processor 200. The input device includes any suitable one of, or any suitable combination of, a touch screen, a keypad, a trigger (e.g. to initiate the performance of any encoding task), and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices, such as the access points 108. The communications interface 212 includes any suitable hardware (e.g. transmitters, receivers, network interface controllers and the like) allowing the device 104 to communicate, e.g. over the above-mentioned WLAN.

The components of the device 104 are interconnected by communication buses (not shown), and powered by a battery or other power source, over the above-mentioned communication buses or by distinct power buses (not shown).

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a communication control application 216, also referred to herein as the application 216. The device 104 is configured, via execution of the application 216 by the processor 200, to detect certain connectivity events and initiate processes for updating a repository 220 of network configuration parameters stored in the memory 204 in response to such events. The device 104 is also configured, via execution of the application 216, to assist other devices 104 in updating their network configuration parameters following detection of connectivity events at such other devices 104.

In other examples, the processor 200, as configured by the execution of the application 216, is implemented as one or more specifically-configured hardware elements, such as field-programmable gate arrays (FPGAs) and/or application-specific integrated circuits (ASICs). The functionality implemented by the application 216, in conjunction with the network configuration parameters 220, can also be implemented partially or entirely within the communications interface 212, e.g. by a controller in the interface 212 (discrete from the processor 200). The functionality implemented by the application 216 can also be shared between a controller within the interface 212 and the processor 200. In general, therefore, the functionality described herein may be said to be implemented by a networking controller, which is implemented by any of the above mechanisms (e.g. the processor 200 alone, a controller of the interface 212, and the like).

Figure 3:
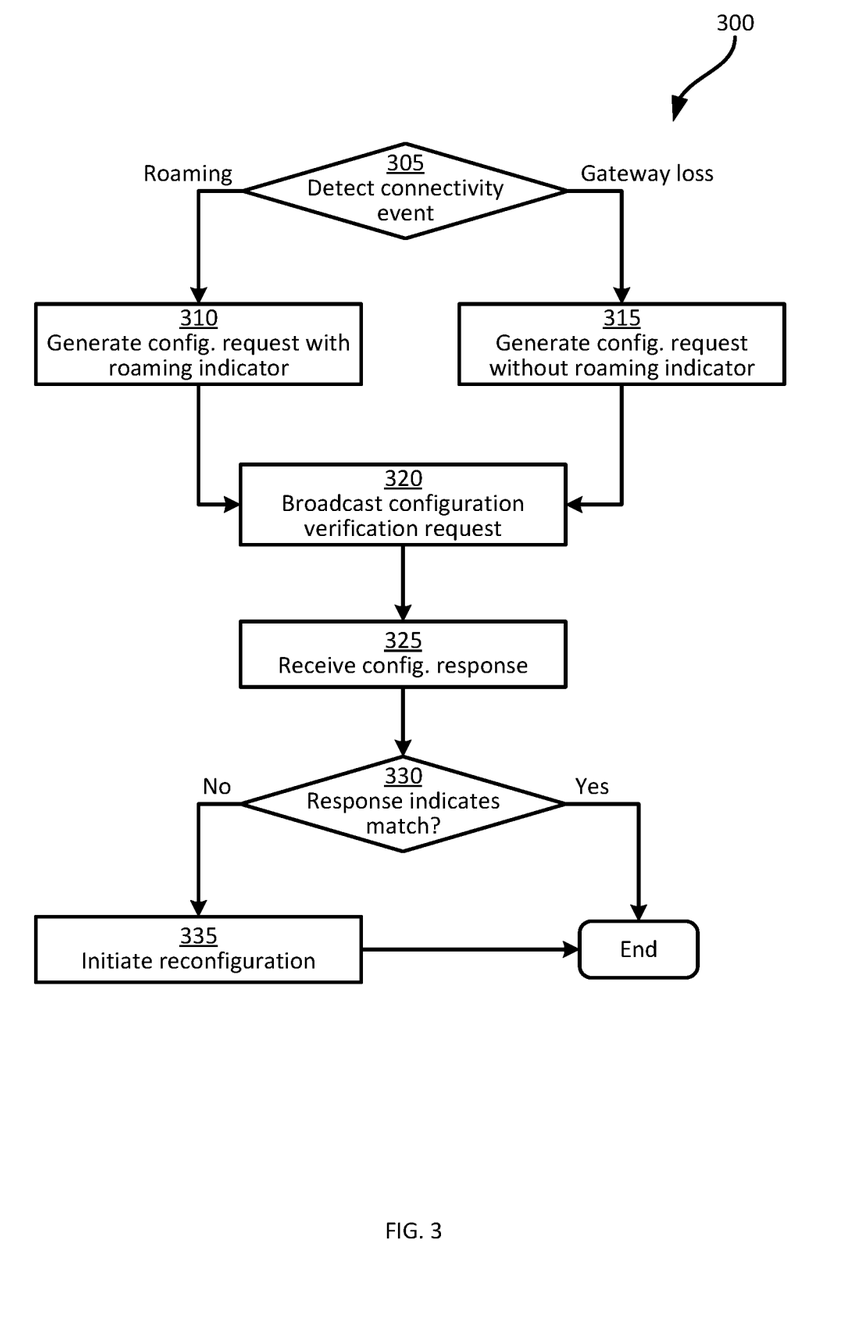
FIG. 3 is a flowchart of a method of updating network configuration parameters.

Turning now to FIG. 3, a method 300 of updating network configuration parameters is illustrated. The method 300 will be described in conjunction with its performance on the system 100. More specifically, the method 300 as described below is performed by the devices 104 in the system 100, with reference to the components of each device 104 as illustrated in FIG. 2.

Figure 4:
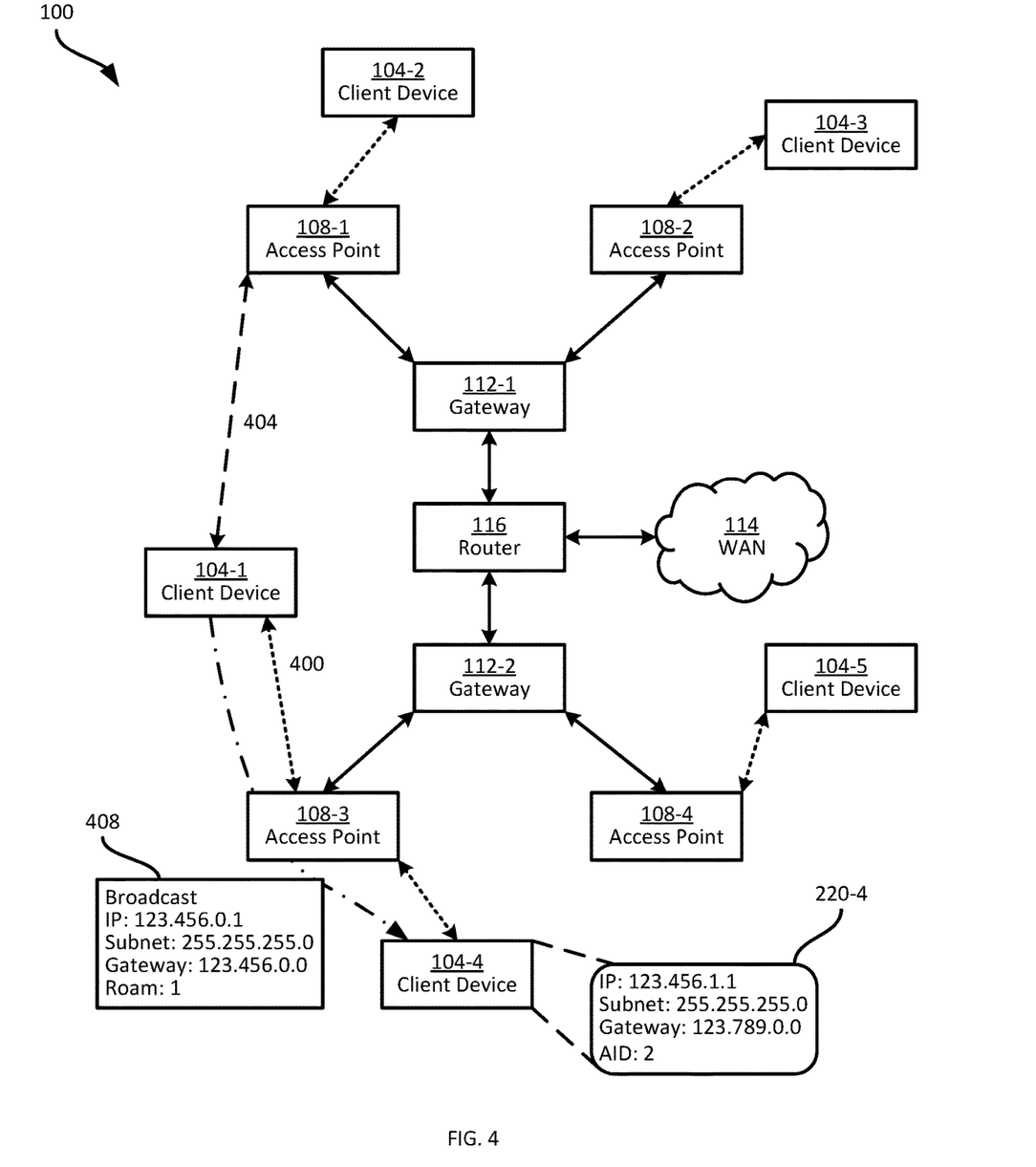
FIG. 4 is a diagram of the system of FIG. 1 following roaming of a wireless client computing device.

At block 305, the device 104 detects a connectivity event. Depending on the nature of the detected connectivity event, the device 104 proceeds to either block 310 or block 315. Specifically, when the connectivity event is a roaming event, in which the device 104 has established a connection with a new AP 108, the device 104 proceeds to block 310. FIG. 4 illustrates an example performance of a roaming connectivity event detected at block 305. In particular, the device 104-1 has physically moved within the facility relative to the location of the device 104-1 shown in FIG. 1. As a result, the device 104-1 has initiated a connection 400 with the AP 108-3. Following establishment of the connection 400, the device 104-1 is configured to disconnect from the AP 108-1 to which the device 104-1 was previously connected (via the link 404). In other words, the roaming event detected at block 305 may be an event initiated by the device 104 itself.

As noted earlier, the AP 108-3 is in a different VLAN and a different subnet than the AP 108-1. The network configuration parameters of the client device 104-1 must therefore be updated Returning to FIG. 3, at block 310 the device 104-1 generates a configuration verification request containing a roaming indicator. The configuration verification request, in the present example, is a broadcast frame (i.e. a link layer message, corresponding to level 2 of the OSI model) addressed to the AP 108-3. The address (e.g. the MAC address) of the AP 108-3 is available to the device 104-1 as a result of the establishment of the connection 400, enabling the device 104-1 to send messages to the AP 108-3 despite other network configuration parameters of the device 104-1 no longer being valid. That is, the IP address and subnet mask of the device 104-1 are no longer valid, and the gateway MAC and IP addresses currently stored in the repository 220 are also no longer valid, as they correspond to the gateway 112-1.

The configuration verification request includes a broadcast instruction for causing the AP 108-3, upon receipt of the configuration verification request, to broadcast the configuration verification request to all devices 104 connected to the AP 108-3. The configuration verification request also includes certain network configuration parameters of the device 104-1, and a flag indicating that the configuration verification request is sent responsive to completion of a roaming process.

Returning to FIG. 4, a configuration verification request 408 is illustrated having been sent to the AP 108-3 from the device 104-1, and broadcast to each other device 104 connected to the AP 108-3 (in this case, to the device 104-4). As seen in FIG. 4, the request 408 contains a broadcast instruction, as well as a network address (specifically, an IP address) of the device 104-1, a subnet mask and a network address of the gateway 112-1. The network address and subnet, as well as the gateway address, were obtained by the device 104-1 from the gateway 112-1 while the device 104-1 was connected to the AP 108-1, and are therefore no longer valid. The request 408 also includes a roaming indicator, which in the present example is a binary flag, with the value "1" indicating that the device 104-1 has roamed to the AP 108-3. The value "0", in contrast, would indicate that the request 408 is not sent responsive to a roaming event. A wide variety of other roaming indicators may also be employed, including alphanumeric strings, message headers or the like. The content of the configuration verification request when the connectivity event is not a roaming event will be discussed in greater detail below, following the present discussion of the roaming scenario.

Referring again to FIG. 3, at block 320, the device 104-1 broadcasts the configuration verification request generated at block 310. In the present example, as noted above, broadcasting is achieved by instructing the AP 108-3 to broadcast the request 408. In other examples, the device 104-1 can broadcast the request 408 directly. At block 325, the device 104-1 receives a configuration verification response to the request 408. The response is generated by one of the other devices 104 connected to the same AP 108 (i.e. the AP 108-3 in the present example), and may be transmitted to the device 104-1 directly by that other device 104, or via the AP 108-3. Of particular note, the response is not generated by the gateway 112-2 or other backend infrastructure.

The configuration verification response indicates, in general, whether connectivity conditions at the responding device 104 match those indicated in the configuration verification request 408. When the verification request 408 was sent responsive to roaming of the device 104-1, as in the present example, the configuration verification response indicates whether the device 104-1 is still connected to the same VLAN and subnet (that is, whether the AP 108-3 to which the device 104-1 has roamed is in the same VLAN and subnet as the AP 108-1 from which the device 104-1 has roamed). In other words, the connectivity conditions at the responding device 104 are defined at least by the responding device's subnet mask and gateway address. When the subnet mask and gateway address in the configuration verification request 408 match the subnet mask and gateway address of the responding device 104, the responding device 104 and the requesting device (104-1, in the present example) are both correctly configured to communicate over the same VLAN and subnet.

Generation of the configuration verification response will be discussed in greater detail below. At block 330, the device 104-1 determines whether or not the configuration verification response indicates matching connectivity conditions at the responding device. When the determination is affirmative, the performance of the method 300 ends. As mentioned above, in the roaming scenario the configuration verification response indicates whether the device 104-1 is still connected to the same VLAN and subnet after the roaming procedure that initiated the performance of the method 300. When the device 104-1 is connected to the same VLAN and subnet as previously, the network configuration parameters in the repository 220 remain valid, and no further action is required. Such would be the case, for example, if the device 104-1 subsequently roamed from the AP 108-3 to the AP 108-4.

However, when the device 104-1 is no longer connected to the same VLAN and subnet—that is, when the determination at block 330 is negative—the device 104-1 proceeds instead to block 335 and initiates a network reconfiguration process. The performance of block 335 can include, for example, discarding the current network configuration parameters in the repository 220 and sending a network packet (e.g. a DHCP request) to discover the gateway 112-2 and obtain a new IP address.

Figure 5:
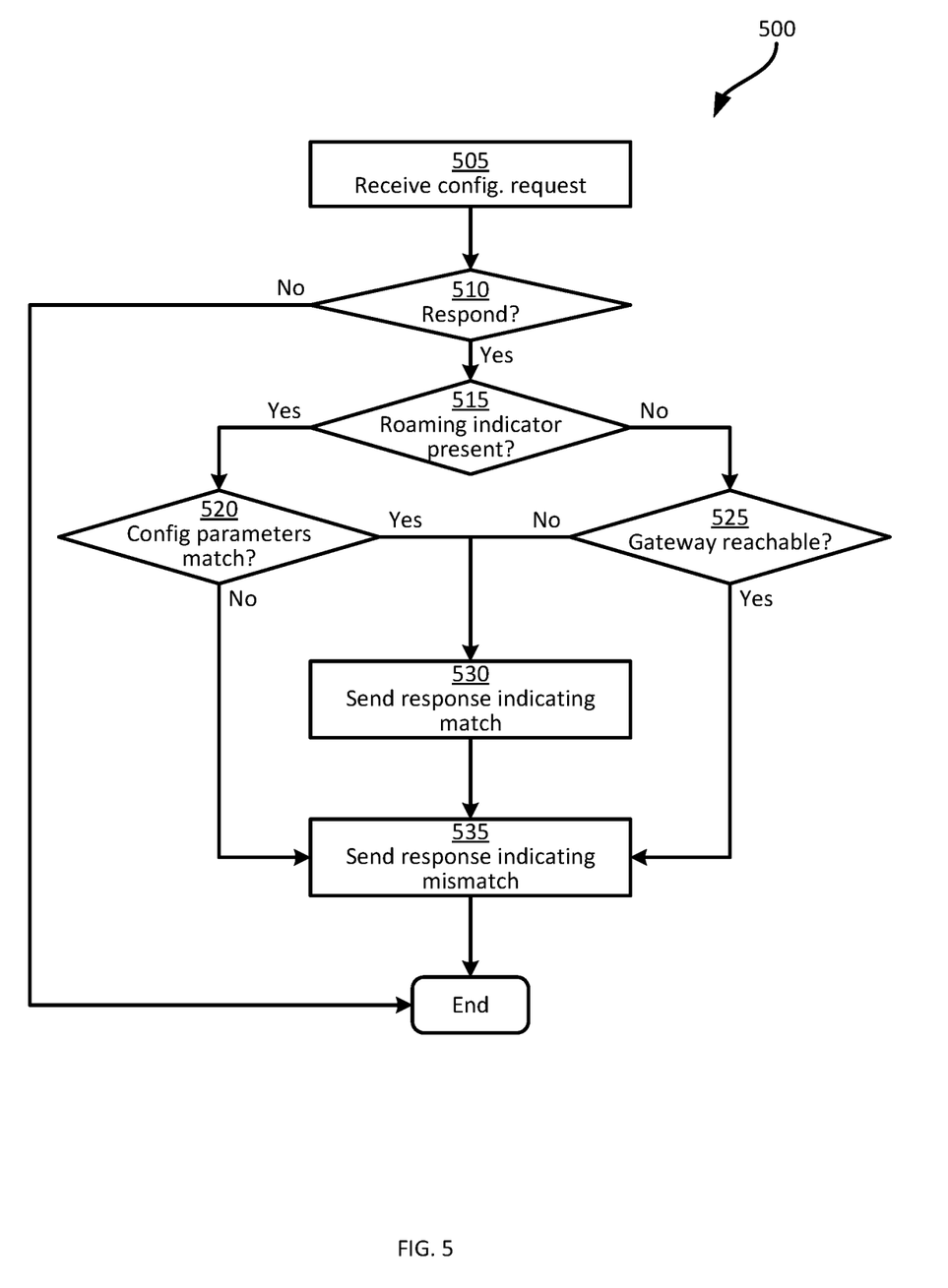
FIG. 5 is a flowchart of a method of generating configuration verification responses.

Turning now to FIG. 5, the generation of the configuration verification response will be described. FIG. 5 illustrates a method 500 of generating configuration verification responses, which is performed by each device 104 that receives a broadcast configuration verification request as discussed above. In the present example, therefore, the method 500 is performed by the device 104-4, which is the only other device connected to the AP 108-3.

At block 505, the device 104-4 receives the configuration verification request, via the access point 108-3. At block 510, the device 104-4 determines whether to respond to the configuration verification request. As noted above, one of the receiving devices 104 generates the configuration verification response. The devices 104 therefore implement a deterministic selection mechanism to enable a single one of the devices 104 to respond (to avoid flooding of the network). For example, each device 104 can be configured to make the determination at block 510 based on an association identifier (AID) assigned to the device 104 by the AP 108-3. For example, the devices 104 can each store a predetermined responder AID in memory, and the determination at block 510 is whether the device 104 has an AID matching that predetermined responder AID.

Other mechanisms for performing the determination at block 510 need not rely on the AIDs of the devices 104. In further embodiments, the determination at block 510 is made by receiving an instruction from the AP 108 to respond. In other words, in such embodiments the APs 108 select which client device 104 is to respond to configuration verification requests, and instruct that client device 104 to respond. The instruction can be inserted into the configuration verification request itself by the AP 108, or transmitted as a separate message.

When the determination at block 510 is negative, the performance of the method 500 ends. When the determination at block 510 is affirmative, however, as is the case for the device 104-4 in the present example, the device 104-4 proceeds to block 515. At block 515, the responding device (i.e. the device 104-4 in this example) determines whether the configuration verification request contains the above-mentioned roaming indicator. When the determination at block 515 is affirmative, as in the case of the request 408, the responding device 104 proceeds to block 520. When the determination at block 515 is negative, the responding device 104 proceeds instead to block 525. Blocks 520 and 525 are both assessments of connectivity conditions at the responding device 104, performed in order to determine whether connectivity conditions at the responding device 104 match the connectivity conditions indicated in the configuration verification request. The assessment at block 520, corresponding to a request containing a roaming indicator, will be described below. The assessment at block 525 will be described after discussion of the roaming-related assessment.

At block 520, the responding device 104 determines whether at least a subset of the configuration parameters in the verification request match those in the repository 220 of the responding device 104. Thus, in the present example, referring again to FIG. 4, at block 520 the responding device 104-4 determines whether the IP address in the request 408, as modified by the subnet mask in the request 408, falls within the range of IP addresses assigned to the VLAN in which the AP 108-3 is located. For example, the IP address and subnet mask in the request 408 can be compared to the IP address and subnet mask in a repository 220-4 of the device 104-4. Instead of, or in addition to, the above comparison, the device 104-4 can determine whether the gateway addresses in the request 408 and the repository 220-4 match.

When the determination at block 520 is affirmative, the responding device 104 proceeds to block 530, and sends a configuration verification response indicating matching connectivity conditions. Such a response leads to an affirmative determination at block 330 at the requesting device. As will be apparent from FIG. 4, in the present example the determination at block 520 is negative, and the device 104-4 therefore proceeds to block 535. At block 535 the device 104-4 sends a configuration verification response to the device 104-1 indicating that connectivity conditions at the device 104-4 do not match those indicated in the request 408 (i.e. that the device 104-1 has moved to a different VLAN by roaming to the AP 108-3). The device 104-1 then makes the negative determination at block 330 noted above, and proceeds to block 335.

According to the mechanisms described above, the system 100 enables a roaming device 104 such as the device 104-1 to determine whether to initiate a process to update network configuration parameters, while minimizing impact on network infrastructure. For example, the roaming device 104-1 is not required to attempt to reach its currently configured gateway 112-1 to determine that the gateway 112-2 cannot be reached before initiating the update process.

The functionality described above also permits the devices 104 to adapt to certain other connectivity events. In particular, returning to block 315 of FIG. 3, if the connectivity event detected at block 305 is the loss of connectivity to a gateway 112 in the absence of roaming, the device 104 generates a configuration verification request that omits the roaming indicator but is otherwise as shown in FIG. 4. The responding device 104, at block 525, determines whether the gateway 112 to which the responding device 104 is connected is reachable. For example, the responding device 104 can send an Address Resolution Protocol (ARP) request to the relevant gateway 112. If no response is received, then the determination at block 525 is negative, and the responding device 104 proceeds to block 530.

As noted above, at block 530 the responding device 104 sends a configuration verification response indicating that matching connectivity conditions exist at the responding device and the requesting device 104. That is, both devices 104 are unable to reach the gateway 112, and the requesting device 104 does not necessarily need to update configuration parameters. Instead, the gateway 112 may simply be offline, in which case requesting updated configuration parameters would be ineffective. When the gateway 112 is reachable by the responding device 104, however, the determination at block 525 is affirmative and the responding device 104 sends a configuration verification response indicating mismatching connectivity conditions. Such a response leads to a negative determination at block 330 and initiation of reconfiguration at the requesting device 104 at block 335.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a client device for updating network configuration parameters, the method comprising:
   establishing a connection between the client device and an access point connected with a set of other client devices;
   detecting a connectivity event at the client device;
   generating a configuration verification request containing current network configuration parameters of the client device;
   transmitting the configuration verification request for delivery to the set of other client devices connected to the access point;
   responsive to transmitting the configuration verification request, receiving a configuration verification response from a responding one of the other client devices connected to the access point; and
   responsive to the configuration verification response indicating non-matching connectivity conditions at the responding client device connected to the access point, initiating a network reconfiguration process at the client device connected to the access point to obtain new network configuration parameters.

2. The method of claim 1, further comprising: responsive to the configuration verification response indicating matching connectivity conditions at the responding client device, maintaining the current network configuration parameters at the client device.

3. The method of claim 1, wherein the connectivity event includes the client device roaming to the access point.

4. The method of claim 3, wherein the configuration verification request includes a roaming indicator.

5. The method of claim 1, wherein the connectivity event includes a loss of connectivity with a gateway device.

6. The method of claim 5, wherein the configuration verification response indicates whether the responding device is connected with the gateway device.

7. The method of claim 1, wherein initiating the network reconfiguration process includes sending a network packet from the client device.

8. The method of claim 1, further comprising:
receiving a further configuration verification request from a further client device; and
determining whether to respond to the further configuration verification request.

9. The method of claim 8, wherein determining whether to respond to the further configuration verification request includes receiving an instruction to respond from the access point.

10. The method of claim 8, wherein the determination of whether to respond to the further configuration verification request is based on an association identifier of the client device.

11. The method of claim 8, further comprising:
when determination of whether to respond to the further configuration verification request is affirmative, generating a further configuration verification response by comparing the further configuration verification request to current connectivity conditions at the client device.

12. The method of claim 1, wherein transmitting the configuration verification request includes one of:
sending a broadcast frame to the access point to cause the access point to deliver the configuration verification request to the set of other client devices; or
sending the configuration verification request directly to the set of other client devices.

13. A client device, comprising:
a communications interface;
a networking controller interconnected with the communications interface, wherein the networking controller is configured to:
establish a connection between the client device and an access point connected with a set of other client devices;
detect a connectivity event at the client device;
generate a configuration verification request containing current network configuration parameters of the client device;
transmit the configuration verification request for delivery to the set of other client devices connected to the access point;
responsive to transmission of the configuration verification request, receive a configuration verification response from a responding one of the other client devices connected to the access point; and
responsive to the configuration verification response indicating non-matching connectivity conditions at the responding client device connected to the access point, initiate a network reconfiguration process at the client device connected to the access point to obtain new network configuration parameters.

14. The client device of claim 13, wherein the networking controller is further configured, responsive to the configuration verification response indicating matching connectivity conditions at the responding client device, to maintain the current network configuration parameters at the client device.

15. The client device of claim 13, wherein the connectivity event includes the client device roaming to the access point.

16. The client device of claim 15, wherein the configuration verification request includes a roaming indicator.

17. The client device of claim 13, wherein the connectivity event includes a loss of connectivity with a gateway device.

18. The client device of claim 17, wherein the configuration verification response indicates whether the responding device is connected with the gateway device.

19. The client device of claim 13, wherein the networking controller is configured, in order to initiate the network reconfiguration process, to send a network packet.

20. The client device of claim 13, wherein the networking controller is further configured to:
receive a further configuration verification request from a further client device; and
determine whether to respond to the further configuration verification request.

21. The client device of claim 20, wherein the networking controller is further configured, in order to determine whether to respond to the further configuration verification request, to receive an instruction to respond from the access point.

22. The client device of claim 20, wherein the networking controller is configured to determine whether to respond to the further configuration verification request is based on an association identifier of the client device.

23. The client device of claim 20, wherein the networking controller is further configured to: when determination of whether to respond to the further configuration verification request is affirmative, generate a further configuration verification response by comparing the further configuration verification request to current connectivity conditions at the client device.

24. The client device of claim 13, wherein the networking controller is further configured, in order to transmit the configuration verification request, to:
send a broadcast frame to the access point to cause the access point to deliver the configuration verification request to the set of other client devices; or
send the configuration verification request directly to the set of other client devices.

25. A system, comprising:
an access point; and
a client device including a communications interface and a networking controller, wherein the networking controller is configured to:
establish a connection between the client device and the access point connected with a set of other client devices;
detect a connectivity event at the client device;
generate a configuration verification request containing current network configuration parameters of the client device;
transmit the configuration verification request for delivery to the set of other client devices connected to the access point;

responsive to transmission of the configuration verification request, receive a configuration verification response from a responding one of the other client devices connected to the access point; and responsive to the configuration verification response indicating non-matching connectivity conditions at the responding client device connected to the access point, initiate a network reconfiguration process at the client device connected to the access point to obtain new network configuration parameters;

wherein the access point is configured to receive the configuration verification request, and to select the responding client device from the set of other client devices connected to the access point.

\* \* \* \* \*